United States Patent [19]

Hetrick

[11] Patent Number: 4,887,032
[45] Date of Patent: Dec. 12, 1989

[54] RESONANT VIBRATING STRUCTURE WITH ELECTRICALLY DRIVEN WIRE COIL AND VIBRATION SENSOR

[75] Inventor: Robert E. Hetrick, Dearborn Heights, Mich.

[73] Assignee: Ford Motor Company, Dearborn, Mich.

[21] Appl. No.: 188,883

[22] Filed: May 2, 1988

[51] Int. Cl.⁴ .................. G01B 7/14; G01R 33/02; G01R 33/00
[52] U.S. Cl. ................................. 324/207; 324/256; 324/260
[58] Field of Search ............ 324/207, 208, 256, 257, 324/260, 261, 262; 310/318, 328, 330; 73/649, 654

[56] References Cited

U.S. PATENT DOCUMENTS

| | | | |
|---|---|---|---|
| 2,530,178 | 11/1950 | Rathkamp | 324/256 |
| 4,297,872 | 11/1981 | Ikeda et al. | |
| 4,806,859 | 2/1989 | Hetrick | 324/257 |

Primary Examiner—Reinhard J. Eisenzopf
Assistant Examiner—Walter E. Snow
Attorney, Agent, or Firm—Peter Abolins; Keith L. Zerschling

[57] ABSTRACT

A vibration type sensor can make a noncontacting measurement of position or sense the passage of an object past a point. The sensor has a coil of wire placed on a vibrating structure. A power supply causes current to be passed through the coil at the resonant frequency of the vibrating structure. As an object with an attached magnet approaches the coil, a force is exerted on the current carrying coil thereby exciting the structure at its resonant vibrational frequency. A piezoelectric bimorph is attached to the structure so that it flexes with the structure producing an emf output proportional to the vibrational amplitude. As the object moves, the field strength at the coil, the amplitude of the vibration and the induced emf change. The latter quantity is used to sense the motion of the object. Alternatively, the magnet remains fixed with respect to the coil while a material of high magnetic permeability approaches the coil and magnet combination thereby perturbing the magnetic field and changing the induced emf. This method can be used to obtain a linear variation of sensor output with position or to enable the use of the device as a timing sensor.

13 Claims, 3 Drawing Sheets

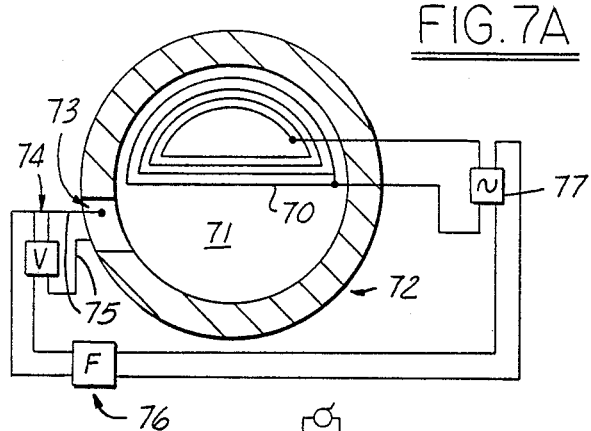
FIG.7A
FIG.7B
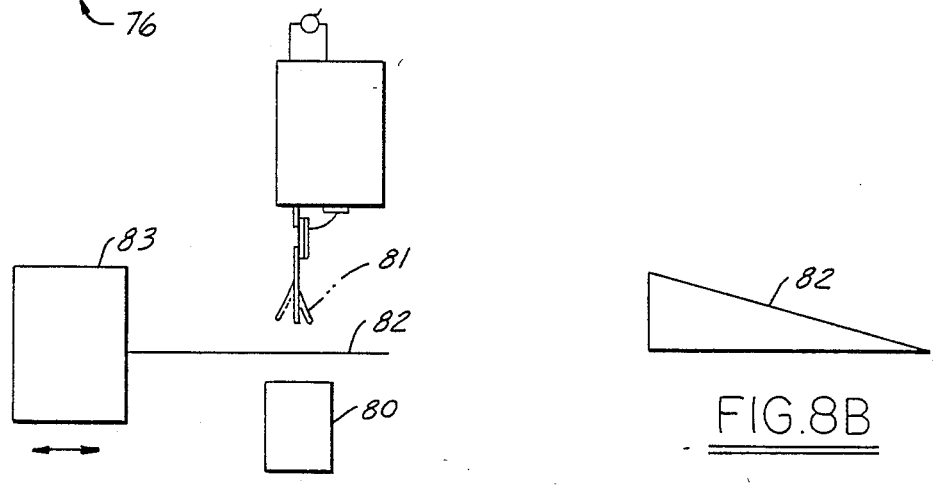
FIG.8A
FIG.8B
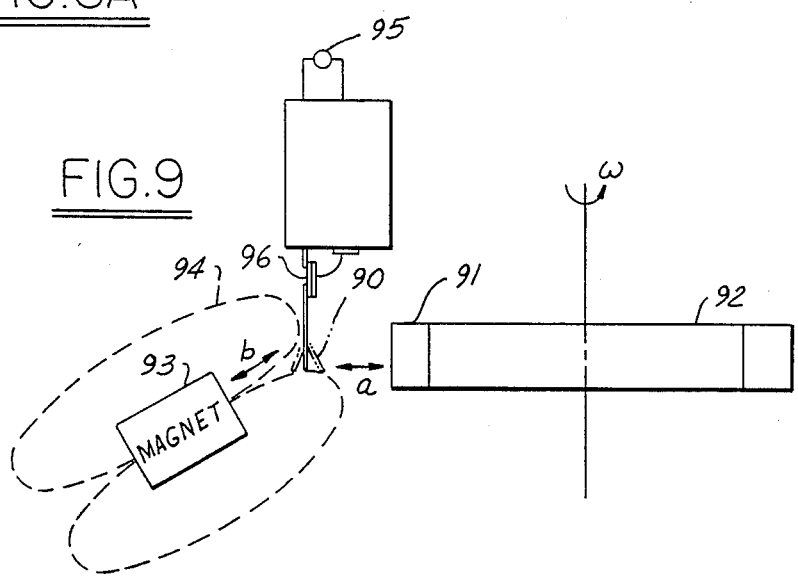
FIG.9

RESONANT VIBRATING STRUCTURE WITH ELECTRICALLY DRIVEN WIRE COIL AND VIBRATION SENSOR

BACKGROUND OF THE INVENTION

1. Field of the Invention

This invention relates to a noncontacting measurement of the distance from an object to a reference point, and/or of the rate at which an object passes a reference point.

2. Prior Art

Many methods are known for determining the position or distance of an object from a reference point. Frequently, these same methods may be used to determine whether an object is present at a position (or a range of positions) or the temporal rate at which an object appears at a position (e.g., as for a rotating or oscillating object).

These methods may be divided into contacting and noncontacting types depending on whether the object, or an extension of the object, contacts the sensing element. A well known contacting method involves measuring a change in electrical resistance and is illustrated in FIG. 1. An extension 11 of an object 10 is an electrical conductor like a metal which slides on a second conductor 13 as the object 10 moves. The change in contact position between the two conductors varies the length, 1, and, accordingly, the resistance of that portion of conductor 13 appearing in an external circuit 14. Element 11 is joined to external circuit 14 by a flexible wire. The variation of resistance with object motion affects the electrical characteristics of external circuit 14 in a manner convenient for measurement, thus providing a sensing of the position of object 10. Although useful in some applications, the contact between element 11 and conductor 13 can be subject to wear, vibration (leading to electrical jitter) or chemical contamination depending on ambient conditions.

Of the numerous types of noncontacting position and/or timing sensors, many involve electromagnetic energy in the form of capacitive, magnetic (e.g., linear variable differential transformer, Hall effect) or optical methods. Acoustical methods (e.g., sonar, ultrasonic) are also widely used. Each of these methods has its particular area of applicability arising from considerations of cost, durability, operating environment, etc.

Also, methods using a resonantly vibrating element in combination with electromagnetic techniques are especially advantageous for use in the automotive environment. U.S. Pat. No. 4,297,872 to Ikeda et al describes a vibration type transducer having a vibrator (e.g., a hollow metal cylinder) and vibration exciters (e.g., piezoelectric elements) which with suitable electrical activation cause the vibrator to vibrate in one or more of its resonant modes. Vibration detection means are located on or near the vibrator to sense the motion and provide an electrical output. In operation, a material or object whose property is to be sensed is suitably placed in proximity to the vibrator so that it modifies the resonant vibrational frequencies. For example, a fluid whose pressure is to be sensed is introduced into the cylinder. The vibrator may be so designed that the change in resonant frequency attending the introduction of this fluid is proportional to the fluid pressure. Alternatively, the temperature of the fluid may alter the resonance in a characteristic way. Different methods may be used so that the approach of an object (e.g., its position) causes this resonance frequency to change in a particular way.

Vibration detection means can be used in two ways. First, they serve as an input to feedback electronic circuitry whose output is applied to the vibration exciters to keep the vibration excited at its resonant frequencies even though those frequencies may be changing. Second, they serve as an input to additional circuitry for processing the frequency information so that an electrical output related to the quantity to be sensed is produced. Such a device typifies one method of operating vibrational sensors in which the quantity of interest modifies the vibrator's resonant frequency. One of the disadvantages of this approach is that sensitivity can be low because the frequency does not go to zero, but rather returns to some fiducial value, as the perturbation or change which causes the frequency variation is reduced to zero.

This disadvantage does not occur in the present case, and an embodiment of this invention has high sensitivity and dynamic range. In addition, the device is appropriate for low cost manufacture as well as the ambient conditions peculiar to the automotive environment.

SUMMARY OF THE INVENTION

The present invention combines the vibrational characteristics of vibrating structures such as cantilever blades with the principles of electromagnetism to achieve a noncontact position and/or timing sensor. The sensor includes a coil of wire which is attached to a vibrating cantilever blade. In the simplest case the attachment is such that one region of the coil vibrates with large amplitude near the unclamped extremity of the blade while another region of the oil is stationary or vibrates with a relatively small amplitude because it is attached near the clamped end of the blade. The coil is largely coplanar with the blade. The free end of the blade with attached coil can be caused to vibrate with significant amplitude if an ac electric current of sufficient magnitude is passed through the coil at the resonant vibrational frequency of the cantilever blade while a magnet is positioned nearby.

An alternating force of attraction and repulsion exists between the coil and the magnet which is proportional to the magnetic field strength at the position of the coil and the magnitude of the ac current in the coil. The force is transmitted to the blade from the coil. Since the force varies at the resonant vibrational frequency of the blade, the blade will vibrate at a relatively large amplitude. The operation is analogous to the operation of an ac electric motor. Motion of the blade can now be detected, for example, if the base of the blade is attached to one end of a length of piezoelectric bimorph whose other end is rigidly clamped. Motion of the blade flexes the bimorph causing an ac emf to be generated across opposing faces of the bimorph. This emf is detected by external circuitry.

Position sensing or timing the passage of an object is effected by varying the magnetic field at the coil in some manner. This in turn varies the force to the blade, the amplitude of the blade vibration and correspondingly the emf output from the piezoelectric element. Variations in the latter quantity are detected and processed in order to sense the motion. For example, a magnet can be attached to the object to be sensed. The magnet is positioned so that as the object moves, the magnet approaches or recedes from the blade thereby varying the field strength at the coil and the output of piezoelectric member. One advantage of this method over others using a coil is that the signal does not depend on the time rate of change of the magnetic field. Thus, if necessary, very slow motions can be detected. Another potential advantage is that only very low voltages may be required to pass current through the coil (whose resistance can be made small) obviating the need for high-voltage power supplies which may be required to establish the vibration in other vibrational methods. Means other than the ceramic bimorph may be used to sense the vibration of the blade. For example, piezoresistors made by ion implantion near the base of a silicon blade could be used to measure blade motion. Alternately a thin element of polymeric piezoelectric material could be affixed near the base of the blade to accomplish the same purpose.

In an alternate embodiment, the magnet is detached from the object and placed in a fixed position with respect to the vibrating coil so that a vibration is induced in the blade. A strip of magnetic material of high permeability (e.g., iron, nickel) is attached to the object. The coil/magnet combination is positioned so that as the object moves the magnetic material intercepts the space between the coil and magnet. The magnetic material distorts the magnetic field within this space and prevents it from intercepting the coil thereby reducing the induced vibration. By shaping and positioning the permeable material appropriately, the change in vibrational amplitude and emf induced in the piezoelectric member with the position of the object can be tailored to a desired dependence. For example, a wedge-shaped strip could lead to a desirable linear dependence of object position with emf. Additionally, by appropriate strip design other object motions (e.g., rotary) may be sensed with no modification of the coil/magnet combination.

A modification of the above concept allows the coil/magnet combination to be used as a timing sensor. A typical application of such a sensor is to detect the passage of a tooth on a toothed wheel in a noncontacting manner. In many applications the toothed wheel is made of a magnetic material such as iron. The coil/magnet combination is rigidly fixed with respect to each other so that an ac emf is induced in the piezoelectric member. The combination is placed close to the outer circumference of the wheel. As the tooth of the wheel passes the combination, the magnetic field is distorted so that more magnetic field lines pass through the tooth. By appropriate placement of the magnet and coil, the passage of the tooth can cause fewer field lines to intercept the coil thereby reducing the induced piezoelectric member emf. This reduced emf can be detected and used to sense the passage of the tooth. Of special importance for this method, is the fact that the timing signal does not depend on the velocity of the tooth. Further, the coil/magnet combination can be arranged so that the tooth need not intercept the space between the combination. This factor simplifies practical design considerations.

If the blade is made of silicon, the coil can be fabricated with photolithographic techniques and the signal processing electronics integrated onto the blade itself so that the economics of silicon batch processing can be realized.

BRIEF DESCRIPTION OF THE DRAWINGS

FIG. 7A illustrates another embodiment of the position sensor in which a coil of wire vibrates on a diaphragm.

FIG. 7B illustrates the lowest frequency resonance vibrational mode of the diaphragm of FIG. 7A appropriate for use as a position sensor.

FIG. 8A illustrates another embodiment of the position sensor in accordance with an embodiment of this invention for achieving a sensor output which is linear with position in which the magnet remains fixed and an appropriately shaped magnetic wedge is attached to the object.

FIG. 8B is a plan view of the magnetic wedge of FIG. 8A.

FIG. 9 illustrates another embodiment in which a fixed magnet in combination with a vibrating coil act as a timing sensor such as for the passage, or time rate of change of passage, of the teeth on a toothed wheel of magnetic material.

DETAILED DESCRIPTION OF THE INVENTION

Figure 1:
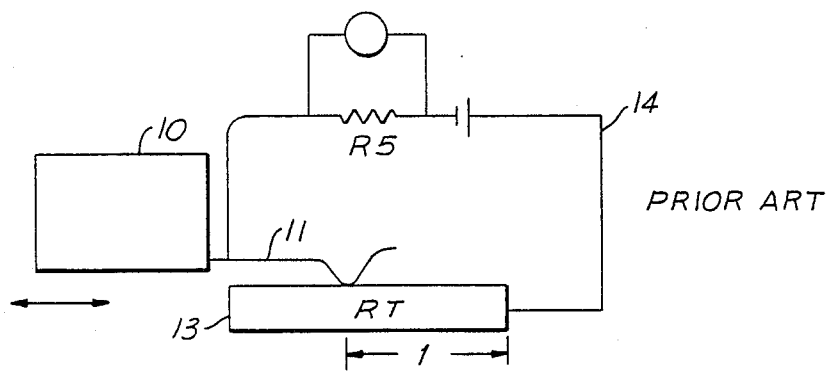
FIG. 1 is a schematic drawing illustrating a contacting position sensor which utilizes a change in electrical resistance to determine an object's position in accordance with the prior art.
Figure 2:
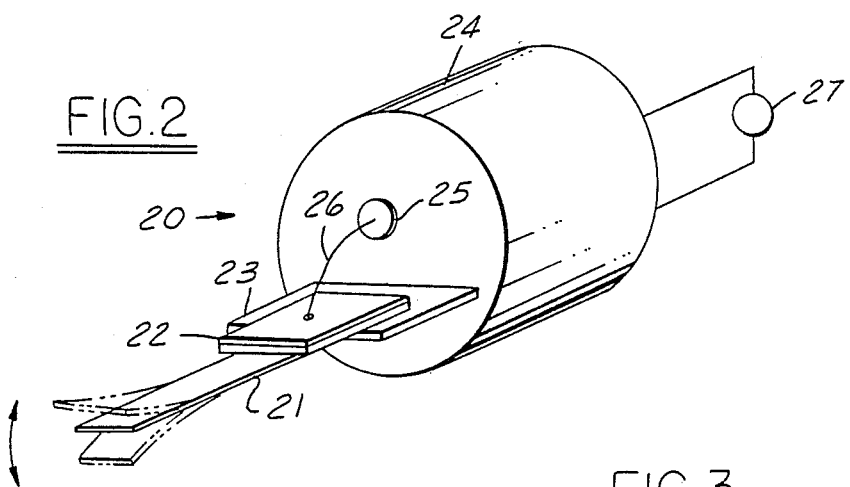
FIG. 2 shows a vibrating cantilever structure in which a vibrating blade is attached by a piezoelectric bimorph to a support structure containing electrical feedthroughs in accordance with an embodiment of this invention.

A noncontacting position sensor 20 employing a piezoelectrically sensed vibrating cantilever is shown in FIG. 2. Sensor 20 includes a cantilever blade 21 onto which a coil (not shown in FIG. 2 for clarity) that is largely coplanar with blade 21 has been attached. The blade/coil combination is attached to the end of a ceramic piezoelectric bimorph 22 which in turn is attached in a cantilevered manner to an extension 23 of a support structure 24. Structure 24 contains two electrical feedthroughs for the purpose of detecting an alternating emf generated between opposing faces of bimorph 22. One feedthrough 25 is shown with a lead wire 26 extending to the upper surface of bimorph 22. For convenience, the extension 23 to which the opposing face of bimorph 22 is attached can be an electrical conductor that serves as the other feedthrough. The cantilever blade and coil combination have a series of resonance vibrational modes at specific resonance frequencies. The fundamental mode is one in which the free end of blade 21 has the maximum vibrational amplitude while the only node is at the point of support of bimorph 22. For a single blade, the frequency of the fundamental vibrational mode is given by $$f = 0.16(h/l^2)(E/\zeta)^{\frac{1}{2}}$$

wherein h is the thickness of a rectangular blade of length l from the free end to the point of constraint, and E and $\zeta$ are the Young's modulus and density, respectively. In the present case, the cantilever is actually a composite of the bimorph extending from its rigid support extension 23 and the attached blade/coil combination. As a result, the resonance frequency differs from that given above although the qualitative dependence of resonance frequency on material parameters (e.g., length, Young's modulus, etc.) is the same as indicated in the formula.

Figure 3:
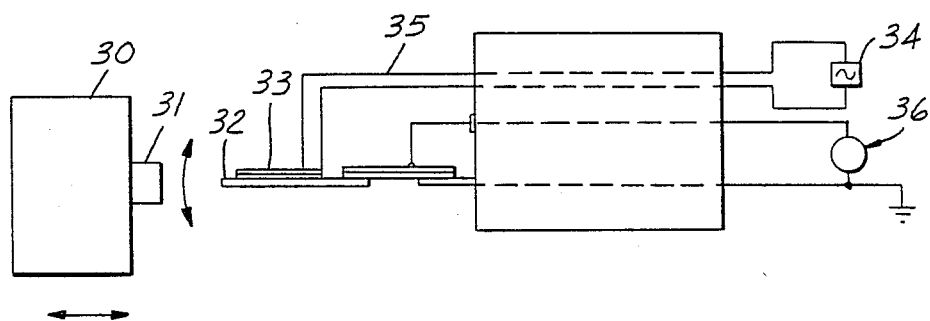
FIG. 3 shows a noncontacting position sensor adjacent to an object to be sensed which has an attached magnet and is placed in a particular manner so that a vibration is induced in the blade when an ac current at the resonant frequency of the blade is passed through the coil. The motion of the blade flexes the attached piezoelectric member resulting in an ac emf from the piezoelectric member.

FIG. 3 is a side view of the invention in use as a noncontacting position sensor. In this embodiment, an object 30, whose position is to be sensed, has an attached permanent magnet 31. Magnet 31 is placed on the object so that as linear motion occurs, magnet 31 approaches or recedes from the tip of a blade 32/coil 33 combination. In operation, a power supply 34 causes an alternating current to pass through coil 33 at the fundamental vibrational frequency of blade 32/coil 33 combination. Operation is also possible by passing current at the frequencies of higher vibrational modes. In the presence of the magnetic field, an alternating force of attraction and repulsion will be exerted on current carrying coil 33 in the same manner as for an ac motor. Since coil 33 is rigidly attached to blade 32, the force is transmitted to blade 32. Because the force is present at the resonant frequency of blade 32/coil 33 combination, it vibrates at a relatively large amplitude. This motion flexes an attached piezoelectric member 37 which in turn generates an emf between opposing faces of piezoelectric member 37. As the object approaches (or recedes from) coil 33, the strength of the magnetic field intercepting coil 33 increases (or decreases) causing the amplitude of vibration and the induced emf to increase (or decrease). The magnitude of the emf is detected by external circuitry 36 connected to piezoelectric member 37 by lead wires. This emf signal serves to sense the motion of the object.

The dimensions, materials and other design parameters for the device are typically chosen for a specific application. As an example, the bimorph can be made of ceramic PZT (lead zirconate titanate) and have the approximate dimension $l_p = 0.4$ cm, $w_p = 0.15$ cm, $h_p = 0.05$ cm. The blade can be made of silicon of 2 mil thickness and have the dimension $l_b = 0.4$ cm, $w_b = 0.15$ cm. A coil can be deposited on the blade with thermally evaporated aluminum using standard photolithographic techniques to delineate the coil pattern. As shown schematically in FIG. 4, for example, a ten turn rectangular coil 41 of 1 micron thickness and 25 micron width is appropriate for a silicon blade 40 described above. Current is passed through coil 41 by a power supply 44. For such a structure, the frequency of the fundamental cantilever resonance of blade 40 is approximately 2k Hz. The Q of the resonance is approximately 50 and is largely determined by the rigidity with which blade 40 is attached to a piezoelectric member 43.

Figure 4:
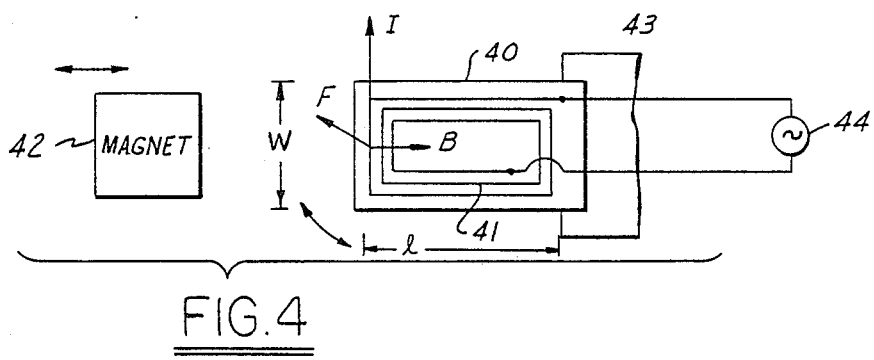
FIG. 4 shows a planar coil of wire on the cantilever blade as well as the induced force on the wire due to the current I in a magnetic field B of a magnet which is attached to an object whose position is to be sensed.

Referring to FIG. 4, the force F on the blade due to the passage of current I through coil 41 in the presence of a magnetic field B (from magnet 42) is given by integrating the differential expression $dF = I \times B dl$ around the turns of coil 41. The vector I stands for the magnitude of the current in the direction of the current as defined by the shape of coil 41. Considering the geometry of FIG. 4 and assuming that the field B is always along the length l of blade 40, the only contributions to the force not acting within the plane of blade 40 are those on the segments of coil 41 along the width of blade 40. Those segments near the attached base of blade 40 are likewise of little effect because of the large effective stiffness of blade 40 for forces applied in this region. Accordingly, the component of the force which is most effective for driving blade 40 in its fundamental cantilever mode occurs at the segments of coil 41 near the free end of blade 40.

Reasonable values for the relevant parameters are $I(max) \sim 20$ mA, $B \sim 0.05$ W/m$^2$, $w \sim 0.001$ m, number of turns $= 10$ which leads to $F(max) = 10^{-4}$N. For a force applied at the extremity of a 50 micron thick blade of silicon, the effective spring constant k of the cantilever is approximately 10 N/m. At very low frequency the maximum displacement ($x_o$) of the blade is, $x_o = F/k \sim 10$ micron. At resonance however, this displacement is multiplied by the Q of the resonance which results in a maximum displacement of the free end of the cantilever of $\sim 1$ mm at resonance. The magnitude of the emf generated when the vibrating blade flexes the attached bimorph will of course depend on the length, the effective stiffness and the piezoelectric properties of the bimorph. Under the above conditions the maximum emf observed was approximately 200 mV for the piezoelectric materials used in this work. It is this electrical signal which is processed to sense the motion of an object.

Figure 5:
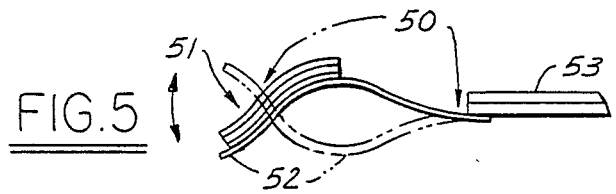
FIG. 5 illustrates the second resonance mode of a vibrating cantilever blade with an attached coil.

One may also exploit the second cantilever resonance illustrated in FIG. 5. Here there are two nodes (50) of the motion, one occurring near a piezoelectric element 53. It would be appropriate for the segments of a coil 51 parallel to the width w to be placed at antinodes 52 of the motion. This is because the electric current along the width w of coil 51 will be in opposite directions at the position of the two antinodes. Accordingly, the force on these two segments will be in opposite directions. However, since the motion of the blade is also opposite at these positions for this mode, this is just the appropriate relationship between the forces that will most effectively excite the mode. More generally, for a given magnetic field pattern, the shape of the coil may be modified to most effectively excite a desired mode.

Figure 6A:
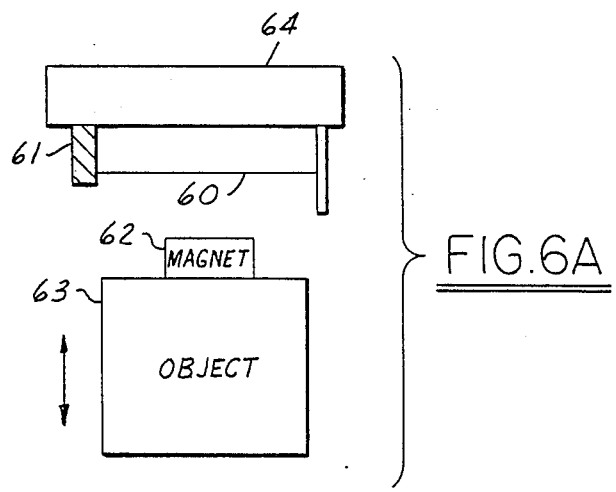
FIG. 6A illustrates another embodiment of the position sensor including a vibrating wire suspended between two posts (one of which is a piezoelectric bimorph) and positioned properly with respect to a magnet attached to the object whose position is to be sensed.

This approach is not limited to the vibration of cantilever blades. Indeed, other vibrating structures could be advantageous from the viewpoint of manufacture or function. As an example, consider the single wire 60 attached to two posts extending from a support structure 64 as in FIG. 6A. Post 61 is a piezoelectric bimorph. Electrical contacts to opposing faces of the bimorph post 61 have been made but are not shown. Similarly, an unshown power supply passes an ac current through the wire 60 at the frequency of the first standing wave resonance mode of wire 60.

Figure 6B:
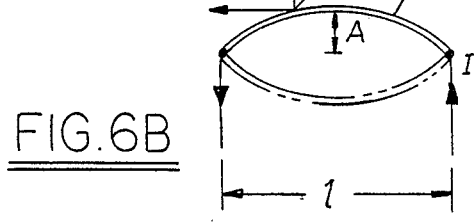
FIG. 6B illustrates the first resonance vibrational mode of the wire of FIG. 6A and the relevant parameters for computing the applied force.

That frequency depends on physical parameters of wire 60 as well as the tension existing in wire 60 caused by its attachment. If a magnetic field originating from a magnet 62 attached to an object 63 is present in a direction perpendicular to the direction of displacement of wire 60, a force on wire 60 will be induced in a direction perpendicular to both the current and field directions as shown in FIG. 6B. The vibrating wire will flex the piezoelectric bimorph post 61 resulting in an induced emf which can be processed as required. As the object 63 moves, the magnetic field strength at wire 60, the vibrational amplitude of wire 60, the flexure of bimorph post 61 and accordingly the magnitude of the induced emf will vary thereby sensing the motion of object 63. The size of the signal could be increased by increasing the force on wire 61.

For a given current level one way to do this would be to place additional wires 70 on a vibrating diaphragm 71 as shown in FIGS. 7A and 7B. In that way each wire could be connected near a base 72 of diaphragm 71. In the presence of a magnet, the force on the wires which cross in the center of diaphragm 71 would add resulting in a large deflection of the diaphragm. This motion would be "read out" by a piezoelectric element 73 which could form a portion of the peripheral supporting structure at the lease of diaphragm 71. Lead wires 75 from opposing surfaces of element 73 attach element 73 to a voltage sensing device 74. Also shown is a feedback circuit 76 discussed below which would sense the induced emf and feedback to a power supply 77, driving coil wires 70 to maintain its frequency always at the resonance frequency of diaphragm 71. In the same way other vibrating structures particularly appropriate for other applications can be designed.

Whatever the structure of the vibrating wires, as the magnet attached to the object approaches them, the field strength may change nonlinearly necessitating additional signal processing. Linearity can be regained by shaping the magnet or using additional fixed magnets. An alternate approach, shown in FIG. 8A, is to leave the magnet 80 in a fixed position relative to a vibrating element 81 while a high magnetic permeability material 82 attached to an object 83 intercepts the field. The shape of the permeable "shield" (such as a wedge shown in FIG. 8B) can be designed so that the motion of the object linearly changes the field strength at the position of the vibrating wires thereby realizing a linear sensor output with position. Linear response for different object motions such as rotary travel can be accomplished with different shapes for the shield.

In the use of resonant vibrational structures with a moderately large Q, small dimensional variations in manufacture or changes in material properties with temperature or pressure will cause the resonance frequency to change. If the structure is electrically driven somewhat off resonance, the vibrational amplitude and accordingly the magnitude of the sensor output will decrease rapidly as the deviation from the resonant frequency increases. Thus, to usefully implement this concept, a convenient method is required to electrically sense the motion of the blade and use this signal as the input to feedback electronic circuitry which keeps the ac current in the coil always at the resonant frequency of the cantilever despite the fact that this resonant frequency may be changing.

Feedback circuitry which accomplishes this objective can be constructed by those skilled in this art. The prior art, U.S. Pat. No. 4,297,872, discusses such techniques using phase locked loops. In this case, the output signal from the piezoelectric element is also the appropriate input to the feedback circuit whose output drives the ac current through the coils. Such circuitry is indicated by element 76 in FIG. 7A.

Electronic circuitry is also required to process the output signal and obtain the desired information. That signal is in the form of an amplitude modulated sine or carrier wave (at the resonant vibrational frequency) similar to that employed in amplitude modulated radio signals. The electronic task, familiar to those skilled in the art, is to demodulate the signal.

An additional application of the vibrating coil-magnet assembly would be that of a timing sensor similar to that used for engine speed and crankshaft position sensing in current automotive applications. The usage is illustrated in FIG. 9 where a vibrating coil 90, magnet 93 assembly is positioned close to teeth 91 (made of iron or other magnetic material) of a gear 92 whose rotational motion indicates speed for example. Thus, speed would be determined by the number of teeth passing a reference point per unit of time. Device operation depends on the appropriate placement of magnet 93 with respect to the coil. Dashed lines 94 coming from magnet 93 suggest the form of the magnetic field.

With the tooth at its furthest distance from the coil 90, magnet 93 assembly, magnet 93 is positioned so that a substantial field is present at coil 90 resulting in a large vibrational amplitude where current at the resonance frequency is passed through coil 90 from power supply 95. A large emf is present at the output of a piezoelectric member 96. As the tooth approaches the assembly, it captures the magnetic field decreasing its value at coil 90 and as a result diminishes the amplitude of vibration and piezoelectric member 96 emf. This reduction marks the passage of the tooth and the rate of tooth passage can be determined by external signal processing circuitry which uses the induced emf as input. The key to the device operation is to achieve a large emf variation. This in turn will depend on the relative sizes of magnet 93, coil 90, teeth 91, the distance of the teeth from the coil magnet assembly, and the magnetic properties of the material from which teeth 91 are made.

Using cantilever blades of the sizes assumed in the prior calculation and small cylindrical magnets (e.g., samarium cobalt rare-earth magnets from Hitachi Magnetics Co.) of comparable dimensions, induced emf reductions by a factor of 5 at the closest approach of the teeth (made of iron) have been observed for the geometry of FIG. 9 where the dimensions a and b are on the order of 2-3 mm. One advantage of this technique is that the tooth need not come between the coil and the magnet thus allowing the same sensor unit to be used with different toothed wheels. Secondly, this method has the advantage that the timing signal doesn't depend on the rotational velocity of the wheel as long as the angular frequency of the wheel is less than the angular frequency of vibration of the coil. The linear proportionality of pick-up signal magnitude with rotational velocity is an important disadvantage of some other, nonvibrational, timing sensors.

Various modifications and variations will no doubt occur to those skilled in the art to which this invention pertains. For example, the particular shapes and sizes of the cantilevered components and magnets can be varied from those disclosed here. These and all other variations which basically rely on the teachings through which this disclosure has advanced the art are properly considered within the scope of this invention.

I claim:

1. A resonance vibrating structure including:
   an adjacent external magnet;
   wire coil means coupled to said vibrating structure;
   electrical power supply means coupled to said coil means to pass electric current through said coil means at the resonance vibrational frequency of said structure;

said wire coil means being positioned on said structure so that when current having the resonance vibrational frequency is passed through said coil means in the presence of said external magnet, an electromagnetic force is exerted on said structure which causes said structure to vibrate at its resonance frequency;

a vibration sensing means positioned on the structure so that the vibration of said structure causes an electrically measurable output from said vibration sensing means proportional to the vibrational amplitude;

said coil means being appropriately sized and positioned with respect to said magnet so that the vibration induced output from said vibration sensing means varies in a predetermined desired manner as the magnetic field is perturbed so that the output can serve as a sensor of relative position between an object perturbing the magnetic field and said coil means;

feedback means coupled to said electrical power supply means and to said vibration sensing means for feedback control, said feedback means providing an output which controls the current through said coil means for exciting the vibration and keeping said resonance vibrating structure vibrating at its resonance frequency even though the resonance frequency may be changing with external ambient conditions such as temperature.

2. A resonance vibrating structure as recited in claim 1, further including:
a shield of high magnetic permeability attached to the object whose position is to be sensed, said shield being appropriately shaped and placed so that as the object moves, said shield distorts the magnetic field near said coil means and causes the amplitude of vibration and, correspondingly, the output of said vibration sensing means to vary in a desired manner, such as linearly, with the position of the object.

3. A resonance vibrating structure as recited in claim 1, wherein said coil means and said magnet are fixed and positioned with respect to each other so that the passage of an object of high magnetic permeability distorts the field at said coil means and thus varies the vibrational amplitude and, correspondingly, the output of said vibration sensing means thereby sensing the passage of the object.

4. A resonance vibrating structure as recited in claim 3, wherein said resonance vibrating structure includes:
a planar cantilever blade which vibrates in its first resonance cantilever mode;
said vibration sensing means includes a ceramic piezoelectric bimorph coupled to said cantilever blade which is caused to flex when an electromagnetic force moves said blade, thereby generating an emf which is used to sense the vibration of said blade; and
said coil means being attached to said blade in a substantially coplanar fashion so that a portion of said coil means is located at the base of said blade where there is reduced vibrational amplitude while another portion of said coil means is located at the extremity where the amplitude has its maximum value.

5. A resonance vibrating structure as recited in claim 4, wherein said coil means is fabricated of fine wire having a plurality of turns held together with an adhesive.

6. A resonance vibrating structure as recited in claim 4, wherein said wire coil means is planar and formed by a deposition of metal in combination with photolithographic techniques.

7. A resonance vibrating structure as recited in claim 6, wherein said blade is made of silicon and at least a portion of said feedback means is fabricated on said blade.

8. A resonance vibrating structure as recited in claim 7, further including a planar cantilever silicon blade coupled to said coil means, and said feedback means includes feedback control circuitry whose input is coupled to the output of said vibration sensing means and whose output controls the current passed through said coil means coupled to said blade, said feedback circuitry maintaining the current through said coil means at the resonant frequency of said blade even though this frequency may be changing due to external ambient conditions such as temperature.

9. A resonance vibrating structure as recited in claim 8, wherein said vibration sensing means is a thin layer of piezoelectric polymer attached in a coplanar fashion to said blade and provides a sensor output for use as an input signal for feedback control to maintain resonance conditions.

10. A resonance vibrating structure as recited in claim 8, wherein said vibration sensing means is a silicon piezoresistive element fabricated in said silicon blade itself and located so that vibration of said silicon blade strains said silicon piezoresistive element causing a change in its electrical resistance, and provides a sensor output for use as an input signal for feedback control to maintain resonance conditions.

11. A resonance vibrating structure includes:
an adjacent external magnet generating a magnetic field;
a wire coil means for carrying electrical current having a plurality of turns coupled so as to vibrate as part of said structure;
a diaphragm supporting said wire coil and driven into vibration when an electric current is passed through the coil at the resonance frequency of the diaphragm in the presence of a magnetic field due to an electromagnetic force between the current and the magnetic field and vibrating in its lowest resonance mode in which the only node of the vibration exists at the periphery of said diaphragm and an antinode exists near the geometrical center of said diaphragm;
said wire coil means being attached so that a portion of each turn exists in the regions of the antinode and node respectively;
a vibration sensing means positioned on said structure so that the vibration of said structure causes an electrically measurable output from said vibration sensing means proportional to the vibrational amplitude which increases linearly with the strength of the magnetic field at the position of the current carrying coil near the antinode of vibration;
said wire coil means being positioned with respect to the magnet so that the output from said vibration sensing means varies in a predetermined manner as the magnetic field at the site of the coil is changed due to the nearby motion of an appropriately constructed object thereby indicating the relative position between an object perturbing said magnetic field and said wire coil means.

12. A resonance vibrating structure as recited in claim 11, wherein said vibration sensing means has an induced change in an electrical parameter in response to a change in the magnitude of the magnetic field caused by a change in the relative position of said magnet which is attached to the object whose position relative to the coil is being sensed.

13. A resonance vibrating structure as recited in claim 11, wherein said vibration sensing means has an induced change in an electrical parameter in response a change in to the magnitude of the magnetic field caused by a change in the relative position of a separate highly permeable magnetic material whose position relative to the coil is to be sensed and whose motion causes changes of the magnetic field created by said magnet, whose position relative to the coil is fixed, said permeable magnetic material being spaced from said magnet.

* * * * *